No. 746,455. PATENTED DEC. 8, 1903.
A. J. CAMPBELL.
FISH SPEAR.
APPLICATION FILED AUG. 3, 1903
NO MODEL.
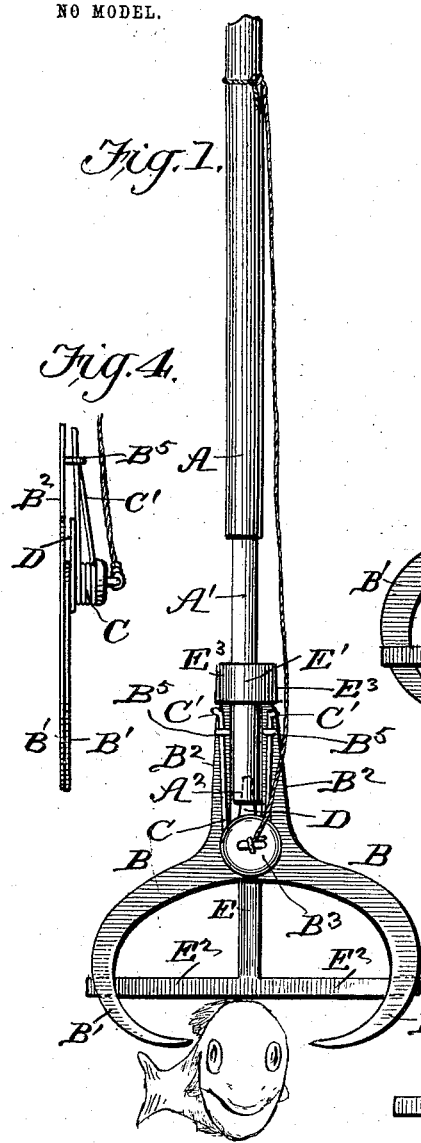
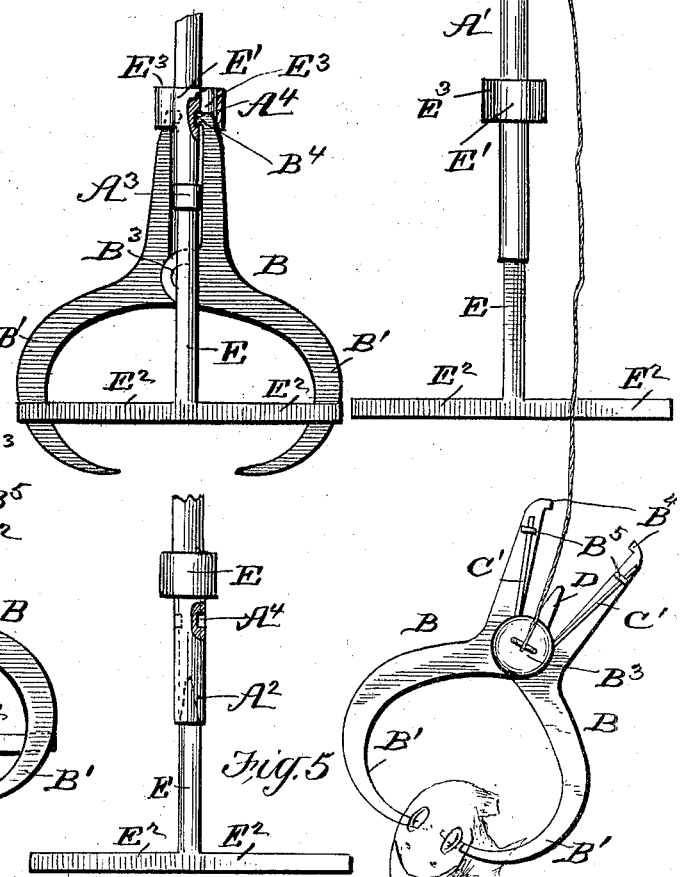
WITNESSES
Jos. A. Ryan
Harrison B. Brown
INVENTOR
A. J. Campbell.
BY Munn & Co.
ATTORNEYS No. 746,455. Patented December 8, 1903.

UNITED STATES PATENT OFFICE.

ANDREW J. CAMPBELL, OF LURAY, VIRGINIA.

FISH-SPEAR.

SPECIFICATION forming part of Letters Patent No. 746,455, dated December 8, 1903.

Application filed August 3, 1903. Serial No. 168,104. (No model.)

*To all whom it may concern:*

Be it known that I, ANDREW J. CAMPBELL, a citizen of the United States, and a resident of Luray, in the county of Page and State of Virginia, have invented certain new and useful Improvements in Fish-Spears, of which the following is a specification.

My invention relates to spears specially intended for catching fish, but equally adapted for catching animals by impaling them therewith.

It consists of a staff or pole having supporting means at one end for two pivoted hooks, which are held closed under tension, and peculiar trigger means whereby the pivoted hooks are held open adapted for use and which operates to release them, all as will hereinafter be fully described with reference to the accompanying drawings and the novel features thereof be pointed out in the claims.

In the drawings, Figure 1 is an elevated view showing my improved fish-spear with the jaws set ready for use. Fig. 2 is a similar view with the jaws closed to impaling position. Fig. 3 is a detail plan opposite to the side shown in Fig. 1, and Fig. 4 is a detail edge view in illustration of the jaw members, &c. Fig. 5 is a view showing the several parts detached.

In practicing my invention I employ a staff or rod A, having a ferrule A' at one end. In the forward end of the ferrule A', I provide a socket A², and at or near the forward end of the ferrule I fixedly secure a loop A³. The ferrule is recessed on opposite sides, as at A⁴, for the purpose as will appear farther on.

B B indicate jaw members constructed with forward inwardly-curved hook-like ends B' and rear diverging arms B². The jaw members B are connected together between their ends by a suitable projecting pivot B³ and have at their inner ends lugs B⁴, adapted when they are set for use to enter the recesses A⁴ in the ferrule A'.

C indicates a suitable spring, which may or may not be secured to the projecting pivot B³, having its ends C' bent or otherwise formed, adapted for engagement with slugs B⁵ in the arms B².

D indicates a suitable shank fixed to the pivot B² and adapted to enter the socket A² in the forward end of the ferrule A'.

E indicates an adjustable arm having support in the loop A³ on the ferrule A'. The inner end of the arm E is fixed to a collar E', having sliding movement on the ferrule A', and its forward end provided with laterally-disposed arms E². The collar E is constructed with pockets E³, adapted to receive the inner ends of the arms B² when the jaws B are set for use and hold them set, as will be understood. The arm E, in connection with its lateral arms E², provides support for the jaw members in addition to tripping means therefor.

In further carrying out my invention I utilize a suitable line F, having one end secured to the jaw members at their pivot connection, as shown, or other desired place. The other end of the line F may or may not be secured to the inner or hand end of the staff A. Obviously a fishing-reel (not shown) may be employed for winding up the line F, if desired.

In the use of my improved fishing-spear the jaw members are set by pressing the arms B² together against tension of the spring C. The shank D is then arranged in the socket A² and the lugs B⁴ on the arms B² placed in the recesses A⁴ on the ferrule A'. In this position of the parts, with the forward or curved ends of the jaw members resting on the arms E² of the tripper-slide E, the collar is slid forward into position, with the rear ends of the arms B² entering the pockets E³. The collar E' being adjusted to position, with its pockets E³ receiving the rear end B² of the jaw member B, as stated, the spear will be set ready for use. Now it is apparent that upon contact of the forward end of the tripper-arm E or its lateral arms E² with a fish or animal the collar E' will be forced back, disengaging its pockets from holding engagement with the arms B². The latter being thereby freed, obviously the spring C will operate to close the curved ends B' of the jaw members, impaling the fish or animal, as by gripping action.

When the jaw members are released, as above described, the shank D is free to be drawn from the socket A² by effort of the fish or animal to get away. Now obviously the staff or pole may be reversed end for end and be used as a fishing-pole, reeling in or out he line, if a reel is used, until the fish or animal is landed or secured, as the case may be.

Having thus described my invention, what I claim as new, and desire to secure by Letters Patent, is—

1. A fishing-spear employing a staff, pivoted impaling jaw members held set under tension, means whereby the jaw members are secured to the staff, automatic means whereby the jaw members are disengaged from the staff, and a line having one end secured to the jaw members, substantially as described.

2. The combination in a fishing-spear, of a staff having a socket in one end, jaw members pivoted together and adapted to be forced to impaling or closed position, a shank on the said jaw members adapted to enter the said socket in the end of the staff, a tripper-arm having forward laterally-disposed arms and a rear collar with pockets, and a line having one end secured to the jaw members, the tripper-arm being adjustably supported on the forward end of the staff, substantially as described.

3. The combination with a staff of the character described, having a socket in its forward end and recesses in its sides, of jaw members pivoted together and adapted to be forced to impaling or closed position, lugs on the jaw members adapted to enter the said recesses in the staff, a tripper-arm having forward laterally-disposed arms and a rear collar with pockets adapted to receive the rear ends of the jaw members when set, and a line having one end secured to the jaw members, substantially as described.

4. The combination in a fishing-spear of the character described, of impaling jaw members and a suitable staff, the jaw members being adapted for disconnection from the staff and having connected therewith one end of a line, substantially as described.

ANDREW J. CAMPBELL.

Witnesses:
S. F. SPILMAN,
G. Y. CHAPMAN.